United States Patent
Wu et al.

(10) Patent No.: US 10,457,155 B2
(45) Date of Patent: Oct. 29, 2019

(54) SYSTEM AND METHOD FOR CHARGING ELECTRIFIED VEHICLE LOW-VOLTAGE BATTERY

(71) Applicant: FORD GLOBAL TECHNOLOGIES, LLC, Dearborn, MI (US)

(72) Inventors: Bo Wu, Northville, MI (US); Mark J. Ferrel, Brighton, MI (US); Josephine S. Lee, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/261,268

(22) Filed: Sep. 9, 2016

(65) Prior Publication Data
US 2018/0072180 A1    Mar. 15, 2018

(51) Int. Cl.
| | |
|---|---|
| H02J 7/00 | (2006.01) |
| B60L 11/18 | (2006.01) |
| H02J 7/02 | (2016.01) |
| B60L 58/12 | (2019.01) |
| B60L 58/22 | (2019.01) |
| B60W 20/13 | (2016.01) |
| B60W 10/26 | (2006.01) |

(52) U.S. Cl.
CPC ......... B60L 11/1866 (2013.01); B60L 58/12 (2019.02); B60L 58/22 (2019.02); H02J 7/007 (2013.01); H02J 7/02 (2013.01); *B60W 10/26* (2013.01); *B60W 20/13* (2016.01); *H02J 7/0021* (2013.01); *Y02T 10/7055* (2013.01); *Y10S 903/907* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 5,717,310 A * | 2/1998 | Sakai ................ | B60L 11/1862 307/10.1 |
| 8,736,101 B2 | 5/2014 | Masuda et al. | |
| 2006/0214637 A1* | 9/2006 | Gonzales ........... | B60L 11/1824 320/128 |
| 2008/0169785 A1* | 7/2008 | Kim .................. | H01M 10/4207 320/124 |
| 2010/0088843 A1* | 4/2010 | Reed ................. | A47L 9/2857 15/389 |
| 2010/0213887 A1* | 8/2010 | Louch ............... | H02J 7/35 320/101 |
| 2011/0168462 A1* | 7/2011 | Stanek .............. | B60L 7/18 180/65.1 |
| 2012/0068663 A1* | 3/2012 | Tanikawa .......... | B60L 11/1816 320/109 |
| 2013/0093391 A1* | 4/2013 | Gale ................. | B60L 11/14 320/109 |
| 2015/0137592 A1 | 5/2015 | Kono | |
| 2016/0052505 A1 | 2/2016 | Zhou | |

* cited by examiner

*Primary Examiner* — Arun C Williams
(74) *Attorney, Agent, or Firm* — David Kelley; Brooks Kushman P.C.

(57) ABSTRACT

A vehicle charging system includes a controller programmed to, in response to a charger being coupled to a power source and parameters being indicative of a low charge level of an auxiliary battery and a full charge level of a traction battery, decouple the traction battery from the power converter and the charger and charge the auxiliary battery from the charger.

20 Claims, 4 Drawing Sheets

SYSTEM AND METHOD FOR CHARGING ELECTRIFIED VEHICLE LOW-VOLTAGE BATTERY

TECHNICAL FIELD

This application generally relates to charging an auxiliary battery of an electrified vehicle while the vehicle is coupled to an external charge station.

BACKGROUND

A plug-in hybrid or electric vehicle requires periodic charging at a charge station in which external power is transferred to the vehicle. Batteries in the vehicle are charged using the external power.

SUMMARY

A charging system for a vehicle includes a controller programmed to, in response to receiving parameters indicative of a full charge level of a traction battery and a depleted charge level of an auxiliary battery coupled to a power converter while a charger is coupled to a power source, decouple the traction battery from the power converter and the charger and charge the auxiliary battery from the charger.

A vehicle includes a power converter configured to transfer power from a charger and a traction battery to an auxiliary battery. The vehicle further includes a controller programmed to, in response an auxiliary battery voltage falling below a predetermined threshold while a traction battery parameter indicates a full charge and the charger is coupled to a power source, isolate the traction battery from the power converter and the charger, and charge the auxiliary battery from the charger.

A method includes decoupling, by a controller, a traction battery from a power converter and a charger in response to receiving parameters indicative of a full charge level of the traction battery and a depleted charge level of an auxiliary battery while the charger is coupled to a power source. The method further includes charging, by the controller, the auxiliary battery from the charger.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
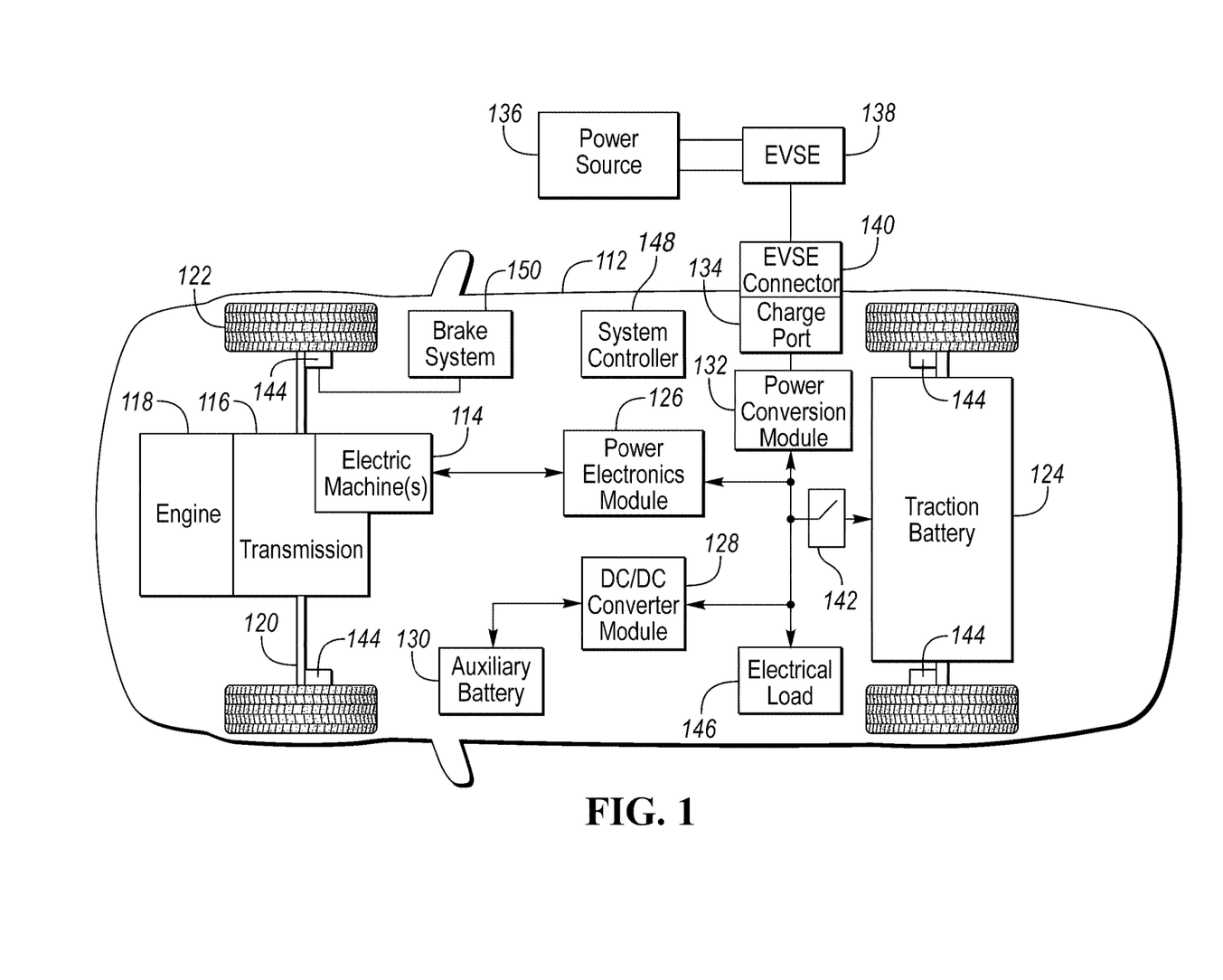
FIG. 1 is a diagram of an electrified vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. A contactor module 142 may include one or more contactors configured to isolate the traction battery 124 from other components when opened and connect the traction battery 124 to other components when closed. The contactor module 142 may be located in the traction battery 124. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
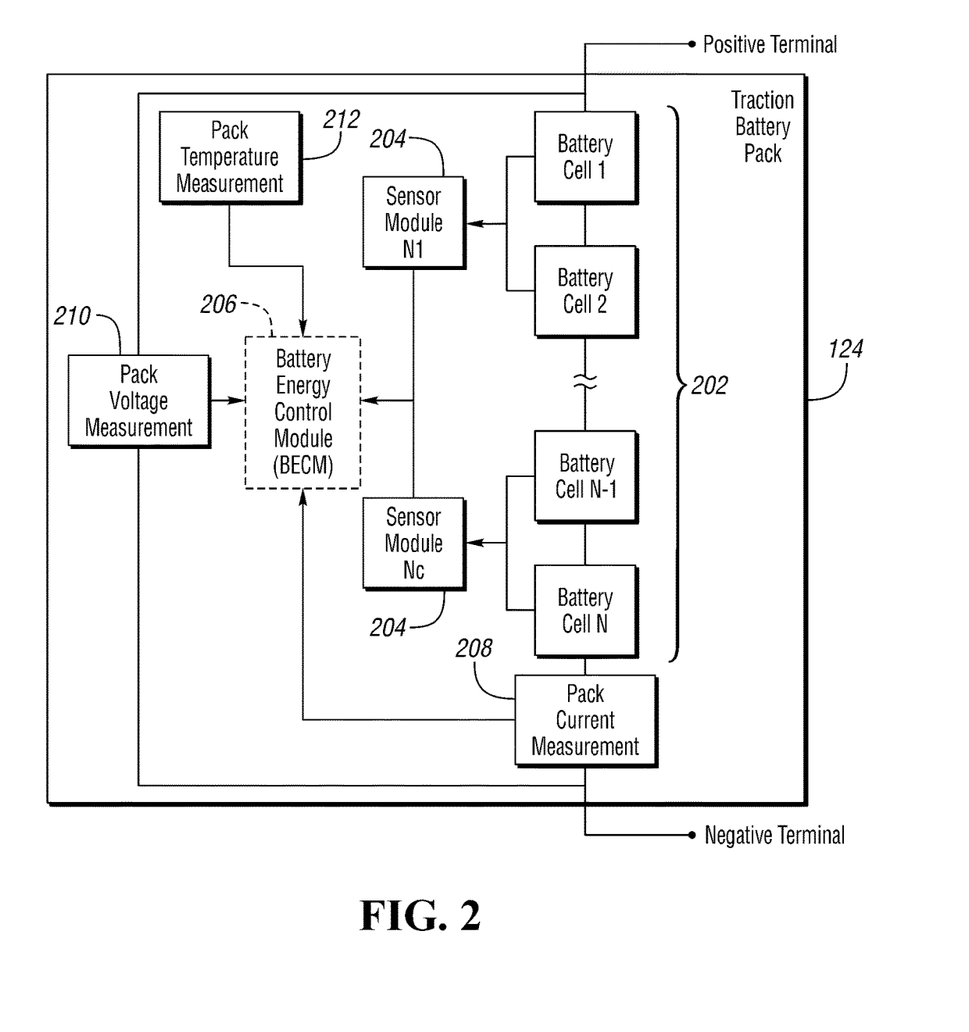
FIG. 2 is a diagram of a traction battery.

A traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the contactor module 142 for opening and closing the associated contactors.

It may be useful to calculate various characteristics of the battery pack. Quantities such as battery power capability, battery capacity, and battery state of charge may be useful for controlling the operation of the traction battery 124 as well as any electrical loads receiving power from the traction battery 124. Battery power capability is a measure of the maximum amount of power the traction battery 124 can provide or the maximum amount of power that the traction battery 124 can receive. Knowing the battery power capability allows the electrical loads to be managed such that the power requested is within limits that the traction battery 124 can handle.

Battery capacity is a measure of a total amount of energy that may be stored in the traction battery 124. The battery capacity may be expressed in units of Amp-hours. Values related to the battery capacity may be referred to as amp-hour values. The battery capacity of the traction battery 124 may decrease over the life of the traction battery 124.

State of charge (SOC) gives an indication of how much charge remains in the traction battery 124. The SOC may be expressed as a percentage of the total charge relative to the battery capacity remaining in the traction battery 124. The SOC value may be output to a display to inform the driver of how much charge remains in the traction battery 124, similar to a fuel gauge. The SOC may also be used by other controllers (e.g., VSC 148) to control the operation of an electric or hybrid-electric vehicle. Calculation of SOC can be accomplished by a variety of methods. One possible method of calculating SOC is to perform an integration of the traction battery current over time. This is well-known in the art as ampere-hour integration. Additionally, a relationship between an open-circuit voltage of the battery measured after a rest period and the state of charge may be known. The SOC may be utilized by the BECM 206 to determine when the traction battery 124 has achieved a full charge. A full charge may be detected when the SOC is greater than a predetermined threshold (e.g., 95%). The predetermined threshold may be an SOC value above which a manufacturer discourages operation of the traction battery 124. The predetermined threshold may depend upon the battery chemistry and operation strategy of the traction battery 124.

Figure 3:
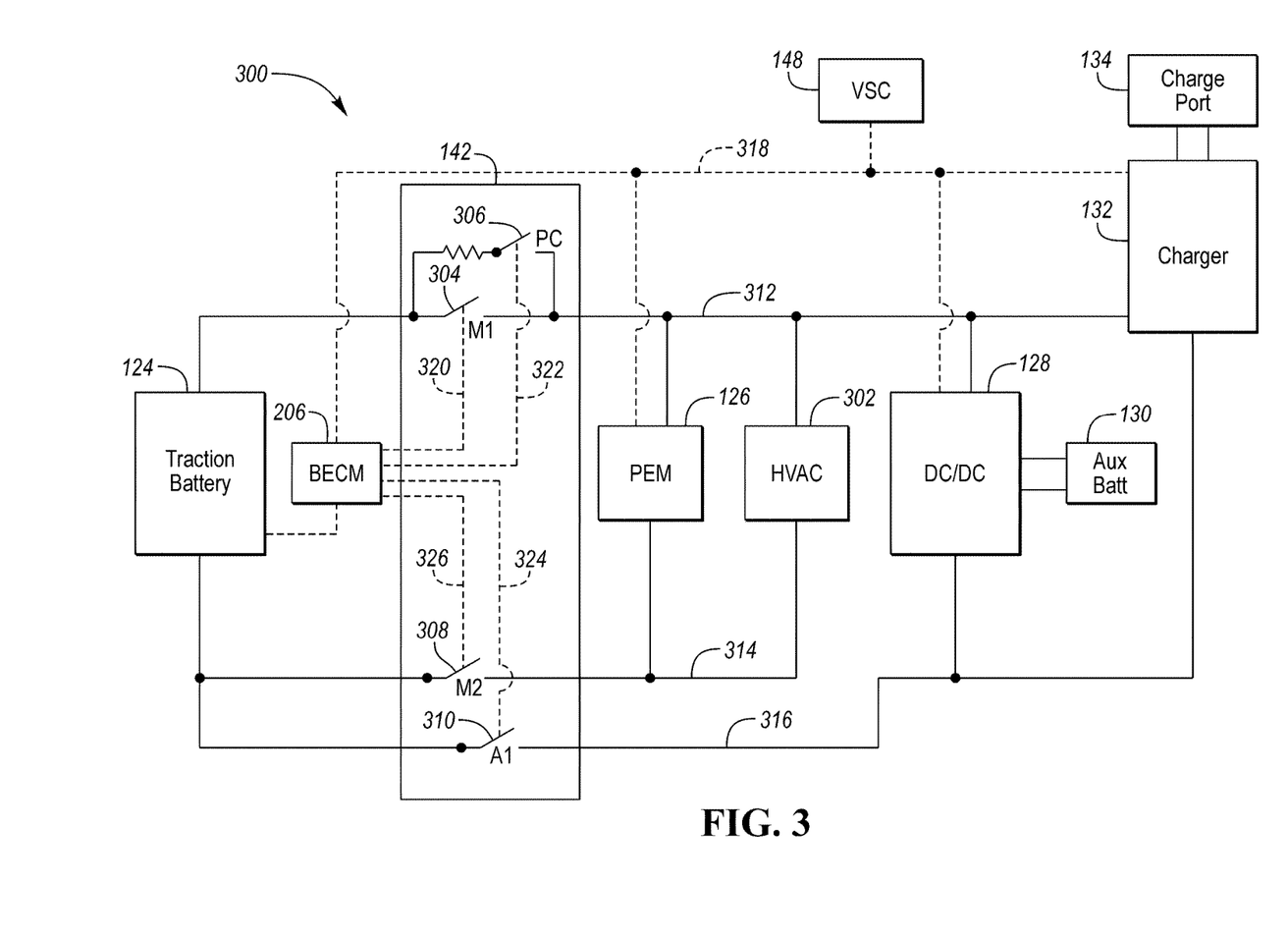
FIG. 3 is a diagram of vehicle components for charging the vehicle.

FIG. 3 depicts a possible vehicle configuration 300 for implementing a charging system for the vehicle. A high-voltage bus may include a high-voltage supply bus 312 and a high-voltage return bus 314. Terminals of the traction battery 124 may be selectively coupled to the high-voltage supply bus 312 and the high-voltage return bus 314 through the contactor module 142. The contactor module 142 may include one or more contactors. For example, a main contactor (M1) 304 may be configured to selectively couple a positive terminal of the traction battery 124 to the high-voltage supply bus 312. A pre-charger contactor (PC) 306 may be configured to selectively couple the positive terminal of the traction battery 124 to the high-voltage supply bus 312 through a resistor. The pre-charge contactor 306 may be used when initially coupling the positive terminal of the traction battery 124 to the high-voltage supply bus 312. A main return contactor (M2) 308 may be configured to selectively couple a negative terminal of the traction battery 124 to the high-voltage return bus 314.

The contactors may be implemented as a switch that is closed by a solenoid or relay that includes a coil. The contactors may operate in an open state in which the terminals of the contactor are isolated from one another and a closed state in which the terminals are electrically connected to one another. The coil of each of the contactors may be electrically coupled to a controller (e.g., BECM 206) via an associated control signal. The control signal may include one or more conductors electrically coupled between the coil and the controller. To energize the coil, current may be caused to flow through coil. The controller may include a solid-state switching device for coupling the coil to power and/or ground. For example, the control signal may include a power supply conductor configured to transmit a predetermined voltage (e.g., 12 Volts) to a first terminal of the coil. A second terminal of the coil may be electrically coupled to the switching device that is configured to connect the second terminal to ground to cause current to flow through the coil (e.g., low-side driver circuit). In some configurations, a high-side driver may be implemented.

A main contactor control signal 320 may electrically couple the controller 206 to a coil associated with the main contactor 304. A main contactor return control signal 324 may electrically couple the controller 206 to a coil associated with the main return contactor 308. A pre-charge contactor control signal 322 may electrically couple the controller 206 to a coil associated with the pre-charge contactor 306.

Various high-voltage modules and subsystems may be electrically coupled to the high-voltage bus. For example, the inverter/power electronics module 126 may be electrically coupled to the high-voltage supply bus 312 and the high-voltage return bus 314. A thermal management system 302 may also be electrically coupled to the high-voltage supply bus 312 and the high-voltage return bus 314. When the main contactor 304 and the main return contactor 308 are activated, a current path may be created through the high-voltage bus. Current may flow through those modules that are electrically connected between the high-voltage supply bus 312 and the high-voltage return bus 314.

The high-voltage bus may further include an auxiliary high-voltage return bus 316. The contactor module 142 may include an auxiliary contactor 310 that is coupled between the negative terminal of the traction battery 124 and the auxiliary high-voltage return bus 316. An auxiliary contactor control signal 326 may electrically couple the controller 206 to a coil associated with the auxiliary contactor 310.

The auxiliary high-voltage return bus 316 may be coupled to some of the high-voltage modules. For example, the DC/DC converter 128 may be electrically coupled between the high-voltage supply bus 312 and the auxiliary high-voltage return bus 316. The charger 132 may be electrically coupled between the high-voltage supply bus 312 and the auxiliary high-voltage return bus 316.

By providing two separate high-voltage return contactors (308, 310), current flow may be controlled in some situations. For example, when the auxiliary contactor 310 is in an open state, no current flows between the traction battery 124 and modules that are coupled to the auxiliary high-voltage return bus 316 (e.g., DC/DC converter 128 and charger 132). In this manner, the traction battery 124 is isolated from the DC/DC converter 128 and the charger 132. During vehicle propulsion, both the main return contactor 308 and the auxiliary contactor 310 may be commanded to a closed state.

During charging, the EVSE connector 140 may be coupled to the charge port 134. When the EVSE connector 140 is coupled to the charge port 134, power may be available to the on-board charger 132. Insertion of the EVSE connector 140 into the charge port 134 may trigger a wakeup signal to the charger 132 and/or the battery controller 206. For example, the battery controller 206 may receive the wakeup signal from the charger 132 via the serial communication link and/or a dedicated conductor of the vehicle network 318. The wakeup signal may cause the battery controller 206 to exit a low-power mode and transition to an operational mode. The battery controller 206 may monitor various parameters to determine if the traction battery 124 should be charged. For example, the SOC of the traction battery 124 may be monitored. If the SOC is less than a predetermined charge level, then charging may be initiated. If the SOC is above a predetermined full charge level, the traction battery 124 may be at a full charge level and no charging of the traction battery 124 is needed at the present time.

For charging of the traction battery 124 to take place from the charger 132, the main contactor 304 and the auxiliary contactor 310 are commanded to close. This completes the circuit between the high-voltage supply bus 312 and the auxiliary high-voltage return bus 316. The main contactor 304 may be commanded to close as well. Closing the main return contactor 308 may be dependent on the demand for the thermal management system 302. When the contactors are closed, the traction battery 124 is electrically coupled to the high-voltage bus and may be charged or discharged.

The charger 132 may include a controller to control and monitor operation of the charger. For example, the charger controller may include voltage sensing modules to measure an input and output voltage of the charger 132. The charger controller may be programmed to adjust the output voltage of the charger 132. For example, the charger 132 may be an AC/DC converter that includes switching devices that are commanded to convert an AC voltage input to a DC voltage output. The charger controller may be programmed to adjust the switching cycle of the switching devices to adjust the output voltage. The output voltage may be adjustable within a predetermined voltage range. The charger controller may receive requests from other controllers (e.g., battery controller 206) via the vehicle network 318 for a particular output voltage or power level at the output of the charger 132. In response to the requests, the charger controller may cause the output voltage or power level to track the requested level.

Devices that convert power from one type to another (e.g., AC to DC) or change the level of the voltage (e.g., DC-DC converter) may be characterized by an efficiency value. The efficiency value characterizes the amount of power loss through the device. The efficiency value may be a ratio of output power to input power. The efficiency value may change as operating conditions changes. For example, temperature and current may impact the efficiency at a given time. The efficiency value provides an indication of energy loss due to the particular device. It may be desired to maximize the efficiency value during operation.

The charger 132 may be characterized by a charger efficiency that provides a measure of the losses of the charger 132. The charger efficiency may vary with the current, voltage and/or power provided by the charger 132. As the charger efficiency varies with the operating point of the charger 132, there may be an operating point at which the charger 132 is most efficient. It may be desired during operation to operate the charger 132 at this most efficient operating point whenever possible.

The DC/DC converter 128 may be configured to convert from a high-voltage level to a low-voltage level for charging the auxiliary battery 130. The DC/DC converter 128 may include switching devices that are configured to selectively connect conductors of the low-voltage bus to the high-voltage supply bus 312 and the auxiliary high-voltage return bus 316 for variable switching times. An associated controller may interface with the switching devices to operate the switching devices and select the switching times such that an output voltage of the DC/DC converter 128 is compatible with the low-voltage bus and the auxiliary battery 130. For example, the output voltage of the DC/DC converter 128 may be controlled within a predetermined voltage range (e.g., 10-18 volts). The output voltage may be adjusted to control the current or power provided to the low-voltage bus. For charging the auxiliary battery 130, the output voltage of the DC/DC converter 128 may be controlled to a voltage that is greater than an open-circuit voltage of the auxiliary battery 130. The open-circuit voltage may be the voltage after a rest period with no load (e.g., zero current).

The DC/DC converter 128 may be characterized by a converter efficiency that provides a measure of the losses of the DC/DC converter 128. The converter efficiency may vary with current, power, and/or voltage that is supplied by the DC/DC converter 128. As the converter efficiency varies, there may be an operating point at which the DC/DC converter 128 is most efficient. It may be desired to operate the DC/DC converter 128 at this most efficient operating point whenever possible.

In some situations, it may be possible that the traction battery 124 is at a full charge level while the EVSE connector 140 is coupled to the vehicle 112. However, it may be possible that the auxiliary battery 130 is at a depleted charge level. Under these conditions, it may be desirable to activate the charging system to charge only the auxiliary battery 130. For example, in some situations, the EVSE 138 may be configured to provide a predetermined maximum power level. It may be possible that the power required to charge the auxiliary battery 130 is greater than the predetermined maximum power level. If charging is initiated in this situation while the traction battery 124 is coupled to the high-voltage bus, some power may be drawn from the traction battery 124 to charge the auxiliary battery 130. In addition, with all of the contactors closed, other high-voltage modules are connected to high-voltage bus and may draw some amount of power from the charger 132 and traction battery 124. To improve the situation, it may be desired in some situations to isolate the traction battery 124 when only charging of the auxiliary battery 130 is needed.

A controller (e.g., VSC 148) may monitor a state of charge of the auxiliary battery 130. For example, the controller may interface with a voltage sensor that provides voltage measurements and a current sensor that provides current measurements. The auxiliary battery SOC may be derived from an Amp-hour integration. The controller may periodically wakeup to check the status of the auxiliary battery 130. When the auxiliary battery SOC falls below a predetermined SOC, it may be determined that the auxiliary battery 130 should be charged. The predetermined SOC may be a predetermined value that ensures that all connected electrical systems can be operated to transition the vehicle to an operational state. The controller may also monitor the voltage level of the auxiliary battery 130. A voltage below a predetermined voltage level may indicate that the auxiliary battery SOC is at a depleted level.

In response to determining that the auxiliary battery 130 needs charging, the controller may wake up the charger 132 and the DC/DC converter 128. Waking up the other modules may be achieved via a control signal which may be a specific message(s) transmitted over the vehicle network 318.

In response to the wake-up signal, the charger 132 may check if the EVSE connector 140 is coupled to the charge port 134 and that power is available from the EVSE 138. The charger 132 may communicate with the EVSE 138 to enable power transfer. The charger 132 may broadcast information via the vehicle network 318 that the charger 132 is ready to provide power.

The battery controller 206 may wake up periodically and check the status of the traction battery 124. The traction battery SOC may be checked to determine if the traction battery 124 is at a full charge level. If the traction battery 124 is not at a full charge level (e.g., traction battery SOC less than a predetermined threshold), the battery controller 206 may close main contactor 304 and the auxiliary contactor 310 to enable charging of the traction battery 124. In this mode of operation, the battery controller 206 may communicate with the charger 132 to control the charger output. For example, the battery controller 206 may transmit a requested power or voltage output of the charger 132. In response to the requested power or voltage request, the charger 132 may control the output power or voltage to the requested level. For traction battery charging, the charger output voltage may be requested to be greater than a voltage of the traction battery 124. For example, the charge output voltage may be set to a voltage level that is greater than an open-circuit voltage of the traction battery 124.

If the traction battery 124 is at the full charge level, the battery controller 206 may command the main contactor 304 and the auxiliary contactor 310 to decouple or isolate the traction battery 124 from the charger 132 (e.g., contactors open). The battery controller 206 may then enter a low-power or sleep mode as no further actions are necessary. In this mode of operation, the controller (e.g., VSC 148) that is managing the auxiliary battery 130 may communicate with the charger 132 to set the charger output power and/or voltage. The charger output may be optimized to reduce losses or maximize efficiency, both in the charger 132 and the DC/DC converter 128, during auxiliary battery 130 charging. In addition, the power requested may be selected to remain within the power capability of the charger 132 and the EVSE 138. Note that when the traction battery 124 is in the circuit, no such limitation is necessary as power can be drawn from the traction battery 124 as well as the charger 132.

To minimize power losses or maximize efficiency, the voltage output of the charger 132 may be commanded to a level that is independent of a voltage level of the traction battery 124. Since the traction battery 124 is disconnected, the voltage output may be reduced to less than the voltage level of the traction battery 124. During auxiliary battery 130 charging, the voltage control may be permitted to operate at different levels. This flexibility may allow for improved efficiency of the charger 132 and the DC/DC converter 126. The charger 132 and DC/DC converter 128 efficiency estimates at various operating voltages and powers may be stored in tables in controller memory. In addition, the efficiency values may be temperature dependent. The efficiency tables may include efficiency data as a function of temperature. When the controller 148 determines a most efficient operating point, the controller may transmit the requested operating level to the charger 132 and the DC/DC converter 128.

Figure 4:
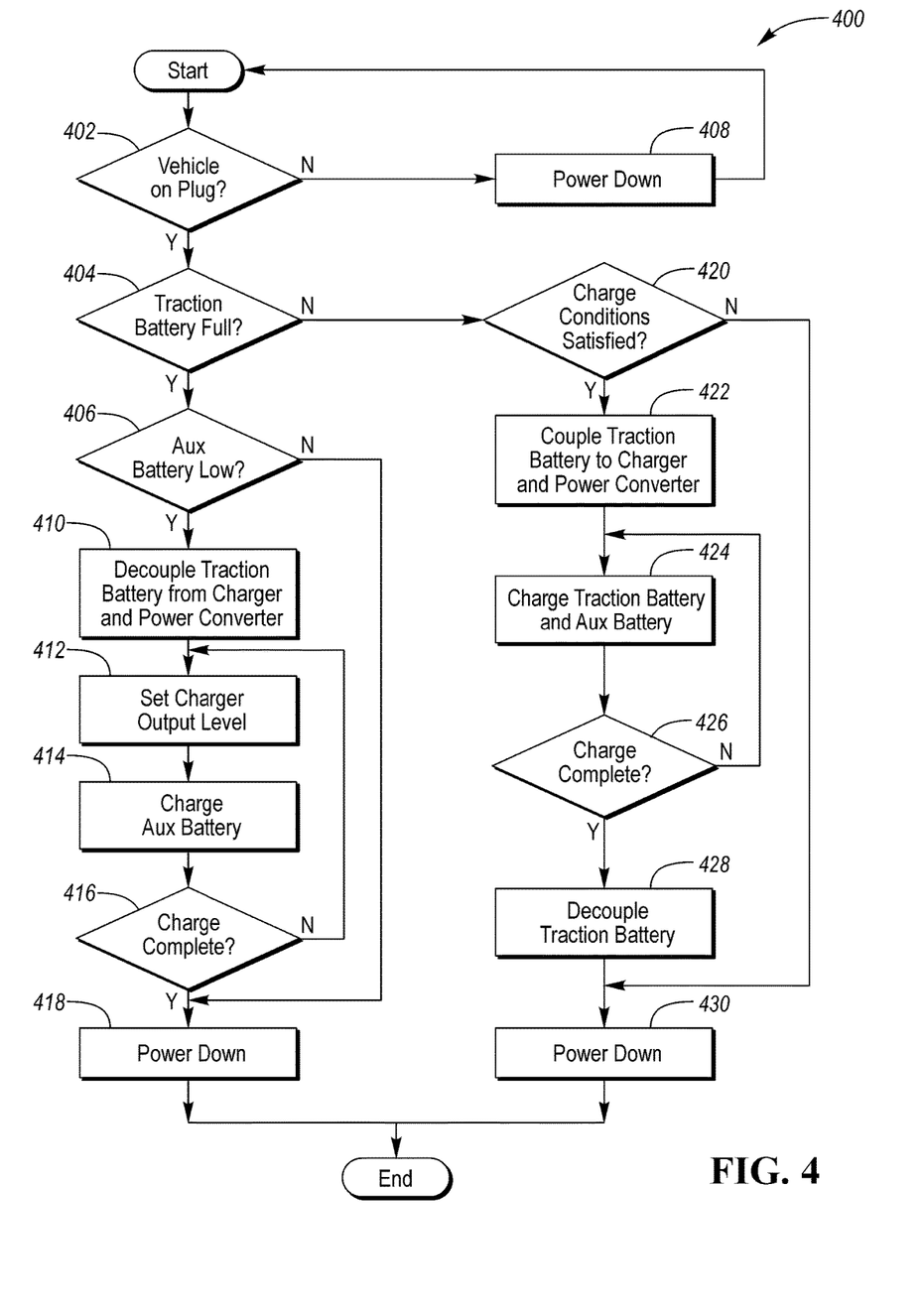
FIG. 4 is a flow chart for a possible sequence of operations for managing auxiliary battery charging.

FIG. 4 depicts a sequence of operations that may be implemented in one or more controllers in the vehicle to provide charging for the on-board batteries. At operation 402, a check may be periodically performed to determine if the vehicle is plugged in (e.g., on plug). That is, the controller checks if the EVSE connector 140 is presently coupled with the charge port 134. If the vehicle is not plugged in, operation 408 may be executed in which the controllers are powered down to enter a low-power state. Operation 402 may be periodically repeated.

If the vehicle is plugged in, then operation 404 may be executed. At operation 404, a check may be performed if the traction battery 124 is full. That is, the controller checks if parameters are indicative of a full charge level of the traction battery 124. For example, parameters that may be checked are a traction battery state of charge and a traction battery voltage. The traction battery 124 may be fully charged when the parameters are greater than associated predetermined thresholds. If the traction battery 124 is not fully charged, operation 420 may be executed. At operation 420, the controller may check if various charging conditions are satisfied. The charging conditions may include the traction battery state of charge or voltage level being less than a predetermined threshold. If the charging conditions are not satisfied, operation 430 may be executed to power down controllers and systems. If the charging conditions are satisfied, operation 422 may be executed. At operation 422, the traction battery 124 may be coupled to the charger 132 and the DC/DC converter 128. For examples the contactors 304, 308 and 310 may be commanded to close. Operation 424 may be executed to control charging of the traction battery 124 and the auxiliary battery 130. At operation 426, a check may be performed to determine is charging is completed. For example, charging may be completed when the traction battery state of charge exceeds a predetermined level. If charging is not completed, operation 424 may be repeated to manage charging. If charging is completed, operation 428 may be executed. At operation 428, the traction battery may be decoupled from the high-voltage bus by opening the contactors. At operation 430, the controller may initiate a power down sequence to enter a low-power mode.

If the traction battery is fully charged, operation 406 may be executed. At operation 406, the auxiliary battery 130 may be checked to determine if a depleted auxiliary battery charge level is present. For example, the auxiliary battery 130 may be depleted when an auxiliary battery state of charge falls below a predetermined threshold (e.g., 40%). The auxiliary battery 130 may be depleted when an auxiliary battery voltage level falls below a predetermined voltage (e.g., 9.5 Volts). If the auxiliary battery 130 is not low, then operation 418 may be executed to initiate a power down sequence until the next wakeup time.

If charge level of the auxiliary battery 130 is low or depleted, operation 410 may be executed. At operation 410, the traction battery 124 is decoupled from the charger 132 and the DC/DC converter 128 by operation of the contactors. For example, the contactors may be opened. At operation 412, the controller may request and/or commend the charger 132 to operate at a selected power level. For example, the power level may be selected to maximize a conversion efficiency of the charger 132 and/or the power converter 128. In addition, the selected power level may not exceed a predetermined power limit of the charger 132 and/or the EVSE equipment 138 that is connected. The selected power level may be selected such that the charge current is limited to an available utility power. At operation 414, the auxiliary battery 130 may be charged from power provide by the charger 132. At operation 416, conditions are checked for completion of auxiliary battery charging. For example, charging may be completed when an auxiliary battery state of charge and/or auxiliary battery voltage level exceed a predetermined threshold. If charging is completed, operation 418 may be executed to initiate a power down sequence. If charging is not completed, execution may return to operation 412.

The sequence of operations depicted in FIG. 4 may be periodically initiated by one or more of the controllers in the vehicle. For example, a controller may periodically wake up to perform the checks. In this manner, the vehicle may remain plugged into utility power for an extended period of time and the traction battery 124 and the auxiliary battery 130 may be maintained at reasonable operating levels.

The charging system disclosed herein prevents issues when the DC/DC converter draws more power for charging the auxiliary battery than the charger can provide. In these situations, the traction battery may have to supply power to charge the auxiliary battery to make up for the deficiency leading to a discharge of the traction battery. Energy is wasted due to conversion losses and energy needed to support operation of the traction battery, along with having to recharge the traction battery when auxiliary battery charging is complete. In addition, other loads connected to the high-voltage bus draw power from the charger and traction battery wasting further energy.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A charging system for a vehicle comprising:
a controller programmed to, responsive to receiving parameters indicative of a full charge level of a traction battery and a depleted charge level of an auxiliary battery coupled to a power converter while a charger is coupled to a power source, decouple the traction battery from the power converter and the charger and reduce a charger output voltage supplied to the power converter to charge the auxiliary battery.

2. The charging system of claim 1 wherein parameters indicative of a full charge level of the traction battery include a state of charge of the traction battery being greater than a predetermined threshold.

3. The charging system of claim 1 wherein parameters indicative of a full charge level of the traction battery include a voltage of the traction battery being greater than a predetermined threshold.

4. The charging system of claim 1 wherein parameters indicative of a depleted charge level of the auxiliary battery include a state of charge of the auxiliary battery being less than a predetermined threshold.

5. The charging system of claim 1 wherein parameters indicative of a depleted charge level of the auxiliary battery include a voltage of the auxiliary battery being less than a predetermined threshold.

6. The charging system of claim 1 wherein the controller is further programmed to charge the auxiliary battery at a power level that does not exceed a power limit of the charger.

7. The charging system of claim 1 wherein the controller is further programmed to command the charger at an output voltage that is independent from a voltage level of the traction battery.

8. The charging system of claim 1 wherein the controller is further programmed to command the charger at a power level that maximizes a conversion efficiency of the power converter.

9. The charging system of claim 1 wherein the controller is further programmed to command the charger at a power level that maximizes a conversion efficiency of the charger.

10. A vehicle comprising:
a power converter configured to transfer power from a charger and a traction battery to an auxiliary battery; and
a controller programmed to, responsive to an auxiliary battery voltage falling below a predetermined threshold while a traction battery parameter indicates a full charge and the charger is coupled to a power source, isolate the traction battery from the power converter and the charger, and reduce an output voltage of the charger.

11. The vehicle of claim 10 further comprising contactors coupled between terminals of the traction battery and the power converter and wherein the controller is further programmed to open at least one of the contactors to isolate the traction battery from the power converter and the charger.

12. The vehicle of claim 10 wherein the controller is further programmed to charge the auxiliary battery at a power level that does not exceed a power limit of the charger.

13. The vehicle of claim 10 wherein the controller is further programmed to command the charger at a power level that maximizes a conversion efficiency of the power converter.

14. The vehicle of claim 10 wherein the controller is further programmed to command the charger at a power level that maximizes a conversion efficiency of the charger.

15. The vehicle of claim 10 wherein the traction battery parameter is a state of charge of the traction battery.

16. The vehicle of claim 10 wherein the traction battery parameter is a voltage of the traction battery.

17. A method comprising:
decoupling, by a controller, a traction battery from a power converter and a charger responsive to receiving parameters indicative of a full charge level of the traction battery and a depleted charge level of an auxiliary battery coupled to the power converter while the charger is coupled to a power source; and
commanding, by the controller, the charger to reduce a voltage supplied to the power converter to charge the auxiliary battery.

18. The method of claim 17 further comprising commanding, by the controller, the charger to a power level that does not exceed a power limit of the charger.

19. The method of claim 17 further comprising commanding, by the controller, the charger to an output power level that maximizes a conversion efficiency of the power converter.

20. The method of claim 17 further comprising commanding, by the controller, the charge to an output power level that maximizes a conversion efficiency of the charger.

* * * * *